United States Patent
Kandori et al.

(10) Patent No.: US 12,143,745 B2
(45) Date of Patent: Nov. 12, 2024

(54) IMAGING APPARATUS, IMAGING SYSTEM, AND IMAGING METHOD

(71) Applicant: CANON KABUSHIKI KAISHA, Tokyo (JP)

(72) Inventors: Atsushi Kandori, Kanagawa (JP); Kazuyuki Shigeta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 17/481,662

(22) Filed: Sep. 22, 2021

(65) Prior Publication Data
US 2022/0103762 A1    Mar. 31, 2022

(30) Foreign Application Priority Data
Sep. 30, 2020    (JP) .............................. JP2020-166212

(51) Int. Cl.
*H04N 5/265* (2006.01)
*H04N 23/45* (2023.01)
*H04N 23/80* (2023.01)

(52) U.S. Cl.
CPC .............. *H04N 5/265* (2013.01); *H04N 23/45* (2023.01); *H04N 23/80* (2023.01)

(58) Field of Classification Search
CPC ........ H04N 5/265; H04N 23/45; H04N 23/80; H04N 23/11; H04N 23/81; H04N 23/951; H04N 25/131
See application file for complete search history.

(56) References Cited

U.S. PATENT DOCUMENTS

| | | | |
|---|---|---|---|
| 9,092,880 B2 | 7/2015 | Shigeta | |
| 9,369,627 B2 | 6/2016 | Ishii | |
| 2013/0342723 A1 | 12/2013 | Ishii | |

FOREIGN PATENT DOCUMENTS

| | | | | |
|---|---|---|---|---|
| CN | 106446957 A | * | 2/2017 | ........... G06K 9/4642 |
| CN | 106683055 A | * | 5/2017 | |
| CN | 107424198 A | * | 12/2017 | ................ G06T 7/11 |
| CN | 107784636 A | * | 3/2018 | ............. G06T 5/001 |
| CN | 110493579 A | * | 11/2019 | ............... H04N 9/04 |

(Continued)

OTHER PUBLICATIONS

Aug. 6, 2024 Japanese Official Action in Japanese Patent Appln. No. 2020-166212.

*Primary Examiner* — Shadan E Haghani
(74) *Attorney, Agent, or Firm* — Venable LLP

(57) ABSTRACT

An imaging apparatus includes a first image sensor for receiving light of a first wave range, a second image sensor for receiving light of a second wave range other than the first wave range, an information acquisition unit for acquiring position information relating to the imaging apparatus and environment information relating to an imaging environment of the imaging apparatus, an estimation unit for estimating, for each subject to be imaged by the imaging apparatus, influence of an external factor of the imaging apparatus on a first image, which is obtained from the first image sensor, by using the position information and the environment information that are acquired by the information acquisition unit, and an image synthesis unit configured to synthesize the first image and a second image, which is obtained from the second image sensor, on the basis of the influence estimated by the estimation unit.

14 Claims, 15 Drawing Sheets

(56) References Cited

FOREIGN PATENT DOCUMENTS

| | | | |
|---|---|---|---|
| JP | 2006-197140 A | 7/2006 | |
| JP | 2011-003048 A | 1/2011 | |
| JP | 2012-186719 A | 9/2012 | |
| JP | 2013-255144 A | 12/2013 | |
| JP | 2016-126724 A | 7/2016 | |
| KR | 20190121460 A * | 10/2019 | |
| WO | WO-2019111817 A1 * | 6/2019 | ............. G06T 15/20 |
| WO | WO-2021182153 A1 * | 9/2021 | |

* cited by examiner

IMAGING APPARATUS, IMAGING SYSTEM, AND IMAGING METHOD

BACKGROUND OF THE INVENTION

Field of the Invention

The present disclosure relates to an imaging apparatus, an imaging system, and an imaging method.

Description of the Related Art

In a case where a distant image is captured outdoors by an imaging apparatus and mist is generated in the environment of imaging, the captured image may be blurred.

Japanese Patent Application Publication No. 2011-3048 discloses a method in which by using information relating to a captured image, a misted part in the image is extracted and correction is performed on the image to obtain an image from which the mist is removed.

SUMMARY OF THE INVENTION

According to an aspect of the present disclosure, it is provided an imaging apparatus including a first image sensor configured to receive light of a first wave range, a second image sensor configured to receive light of a second wave range other than the first wave range, an information acquisition unit configured to acquire position information relating to the imaging apparatus and environment information relating to an imaging environment of the imaging apparatus, an estimation unit configured to estimate, for each subject to be imaged by the imaging apparatus, influence of an external factor of the imaging apparatus on a first image, which is obtained from the first image sensor, by using the position information and the environment information that are acquired by the information acquisition unit, and an image synthesis unit configured to synthesize the first image and a second image, which is obtained from the second image sensor, on the basis of the influence estimated by the estimation unit.

In addition, according to an aspect of the present disclosure, it is provided an imaging system including the imaging apparatus as described above, and a processor for processing a signal outputted from the imaging apparatus. Further, according to an aspect of the present disclosure, it is provided an imaging method including an information acquisition step of acquiring position information relating to an imaging apparatus including a first image sensor for receiving light of a first wave range and a second image sensor for receiving light of a second wave range other than the first wave range and environment information relating to an imaging environment of the imaging apparatus, an estimation step of estimating, for each subject to be imaged by the imaging apparatus, influence of an external factor of the imaging apparatus on a first image, which is obtained from the first image sensor, by using the position information and the environment information that are acquired in the information acquisition step, and an image synthesizing step of synthesizing the first image and a second image, which is obtained from the second image sensor, on the basis of the influence estimated in the estimation step.

Further features of the present invention will become apparent from the following description of exemplary embodiments with reference to the attached drawings.

DESCRIPTION OF THE EMBODIMENTS

Figure 1:
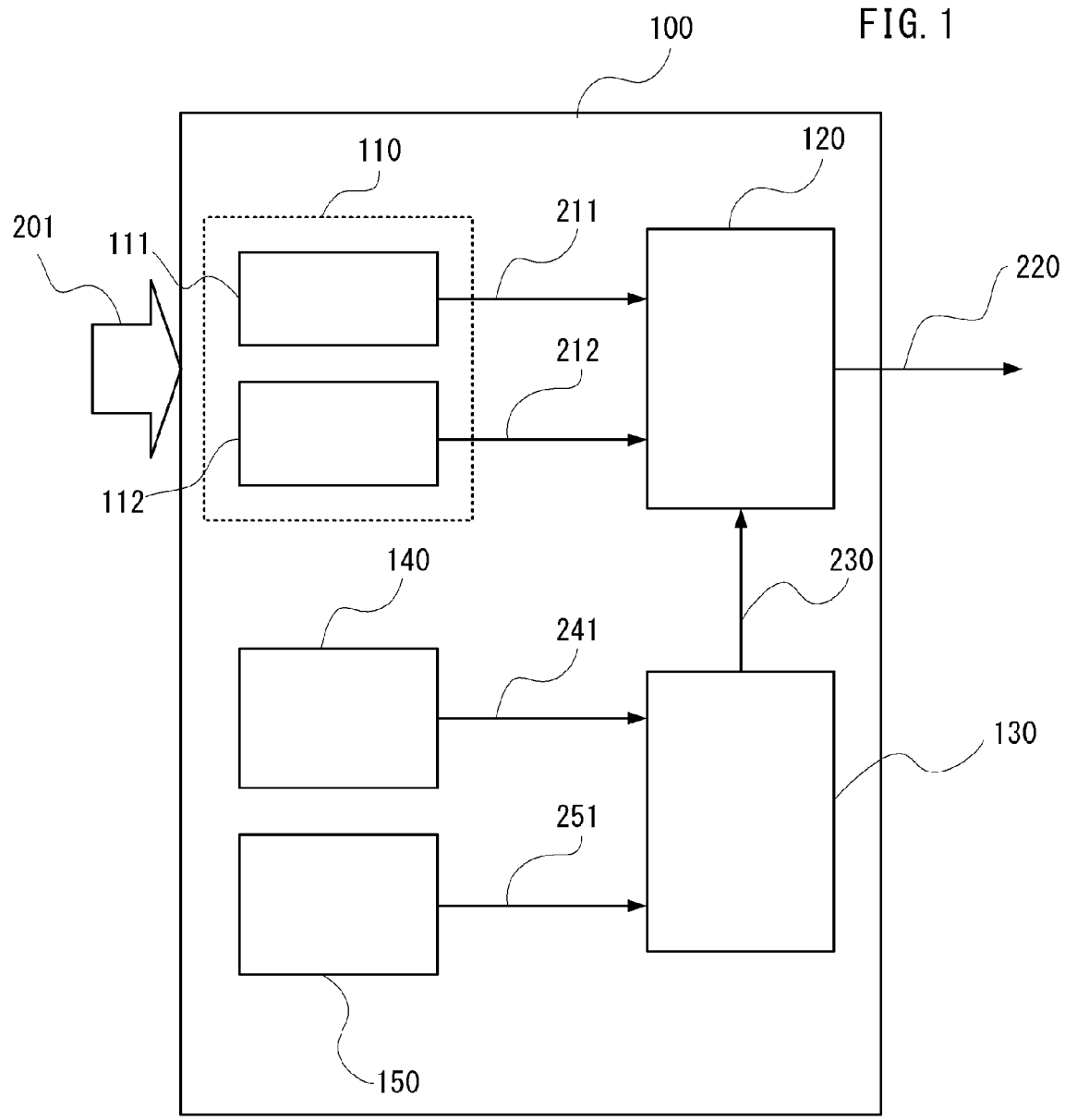
FIG. 1 schematically illustrates the configuration of an imaging apparatus according to a first embodiment.

In the method of correcting an image by detecting mist using information on the image according to the conventional art, image processing may become complicated, leading to the difficulty in correcting a captured image in real time. Moreover, the conventional art in which only information on a captured image is used to correct the image may result in insufficient removal of mist in the image.

In view of the problem, an object of the present disclosure is to provide a technique of obtaining a high-quality image by reducing the influence of an external factor of an imaging apparatus on the image.

Embodiments of the present disclosure will be described below with reference to the accompanying drawings. The same or similar constituent elements, members, and processing in the drawings are indicated by the same reference numerals, and a redundant explanation thereof is optionally omitted. The constituent elements, members, and processing are partially omitted in the drawings.

In the present disclosure, an imaging system quickly detects a misted part in an image captured by the imaging apparatus, corrects the misted part, and obtains a high-quality image by removing the misted part, the imaging system having three main characteristics as follows:

(1) The imaging apparatus includes a first image sensor for performing imaging by receiving light of a first wave range, and a second image sensor for performing imaging by receiving light of a second wave range other than the first wave range.

(2) The imaging apparatus includes an information acquisition unit for acquiring position information relating to the imaging apparatus and environment information relating to the imaging environment of the imaging apparatus, and an estimation unit for estimating the influence of an external factor of the apparatus on a captured image based on the acquired information.

(3) The imaging apparatus includes an image synthesis unit for synthesizing images from image sensors and outputting the images based on the information from the estimation unit.

The imaging apparatus of the present embodiment can obtain a high-quality image that is less affected by a misted part in an image by an external factor of the imaging apparatus, for example, mist.

First Embodiment

FIG. 1 is a block diagram schematically illustrating an imaging apparatus of the present embodiment. As illustrated in FIG. 1, an imaging apparatus 100 of the present embodiment includes an image sensor 110 that includes an image sensor 111 for a first wave range and an image sensor 112 for a second wave range. The imaging apparatus 100 further includes a synthetic-image generation unit 120 and an estimation unit 130.

First, the first characteristic (1) in the imaging apparatus 100 will be described below. The imaging apparatus 100 includes, as imaging devices, the image sensors 111 and 112 that have sensitivity to different wave ranges. Specifically, the image sensor 111 has sensitivity to the wave range of visible light that is an example of the first wave range while the image sensor 112 has sensitivity to the wave range of infrared light that is an example of the second wave range.

The image sensor 111 having sensitivity to the wave range of visible light is an image sensor having sensitivity to the same wave range as human eyes. The image sensor 111 may be an imaging device usable for a camera for typical imaging, obtaining an image like an image visible to human eyes. The first wave range is typically a wave range from 400 nm to 800 nm. The image sensor 112 for imaging of the second wave range is an infrared image sensor having sensitivity mainly to the wave range of infrared light. The second wave range is a wave range of 800 nm or longer relative to the sensitivity of a visible light range that is the first wave range. The image sensors 111 and 112 receive light of the respective wave ranges.

Figure 2:
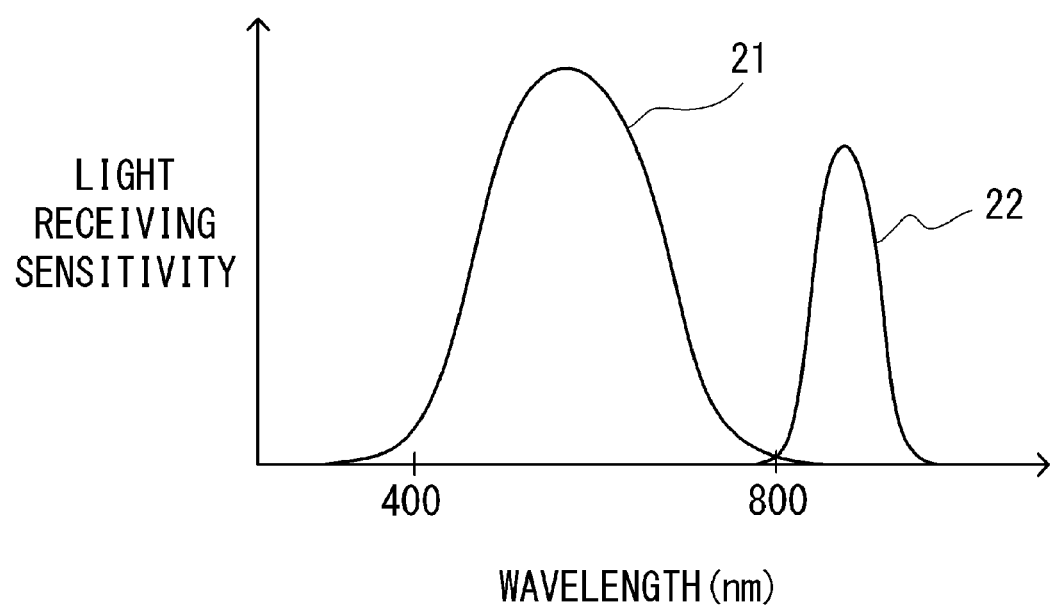
FIG. 2 illustrates an example of the light receiving sensitivity of an image sensor according to the first embodiment.

FIG. 2 is a graph indicating an example of light receiving sensitivity 21 at each wavelength of the image sensor 111 and light receiving sensitivity 22 at each wavelength of the image sensor 112. In FIG. 2, the horizontal axis indicates a wavelength (nm) while the vertical axis indicates an output signal level (light receiving sensitivity) per unit quantity of light. In the present embodiment, the image sensor 111 having sensitivity to the wave range of visible light and the image sensor 112 having sensitivity to the wave range of infrared light are used in combination.

An image obtained by the image sensor 111 (an example of a first image) is an image close to recognition by human eyes. Mist in the imaging environment of the imaging apparatus 100 may generate a misted part in the image as recognized by human eyes. For the purpose of obtaining an image captured to mimic recognition by human eyes, the generation of a misted part is not disadvantageous. However, for the purpose of obtaining an image captured to clearly display a remote site in, for example, remote supervision, the resolution of a subject to be imaged may be reduced by image degradation caused by a misted part. An image obtained by the image sensor 112 (an example of a second image) is characterized by tinges and brightness that are different from recognition by human eyes and a shape and a resolution that are less susceptible to mist or the like in the imaging environment. This characteristic is obtained by the sensitivity of the image sensor 112 to the range of wavelengths longer than visible light.

Thus, the imaging apparatus 100 of the present embodiment generates a synthetic image of captured images from the image sensors 111 and 112. More specifically, the synthetic-image generation unit 120 outputs a synthetic image 220 of an output image 211 from the image sensor 111 for the first wave range and an output image 212 from the image sensor 112 for the second wave range. The ratio of synthesis of the captured image from the image sensor 111 is increased in an area assumed to be free from mist, whereas the ratio of synthesis of the captured image from the image sensor 112 is increased in an area where a misted part is generated.

The present embodiment is characterized in that the image sensor 111 for obtaining an image close to recognition by human eyes and the image sensor 112 for obtaining an image less susceptible to mist or the like in the imaging environment are used in combination. Thereafter, a synthetic image is generated based on the images obtained by the image sensors sensitive to different wave ranges. This can remarkably improve image quality in the area of a misted part in an image, as compared with correction of the area of a misted part in an image obtained from an image sensor having sensitivity to the waver range of visible light.

Figure 3:
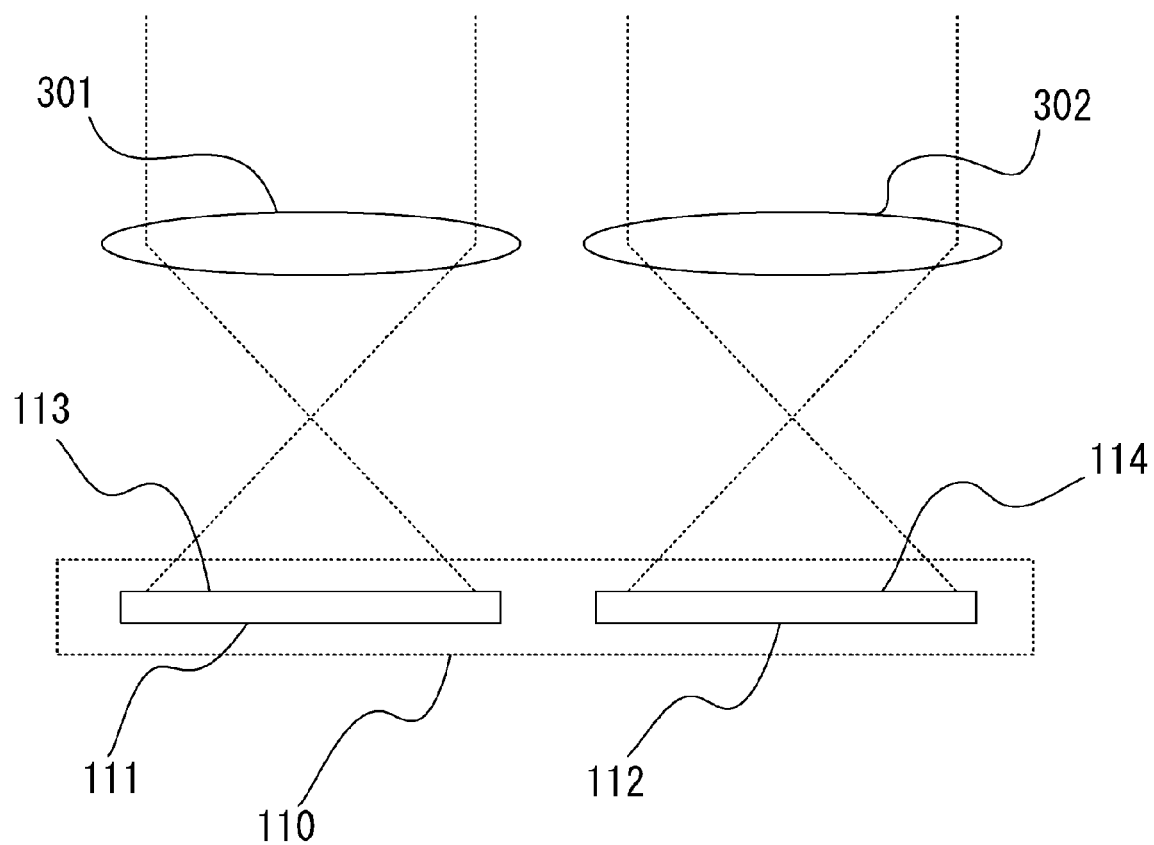
FIG. 3 schematically illustrates the configurations of the image sensors according to the first embodiment.

Referring to FIG. 3, the image sensors 111 and 112 used in the present embodiment will be described below. As illustrated in FIG. 3, the image sensor 111 is provided with a first lens 301 while the image sensor 112 is provided with a second lens 302. A light receiving surface 113 of the image sensor 111 for the first wave range and a light receiving surface 114 of the image sensor 112 for the second wave range are disposed on the same plane and are fixed to be kept at the respective positions. Moreover, light having converged through the first lens 301 is incident on the light receiving surface 113 of the image sensor 111 for the first wave range while light having converged through the second lens 302 is incident on the light receiving surface 114 of the image sensor 112 for the second wave range.

Figure 4:
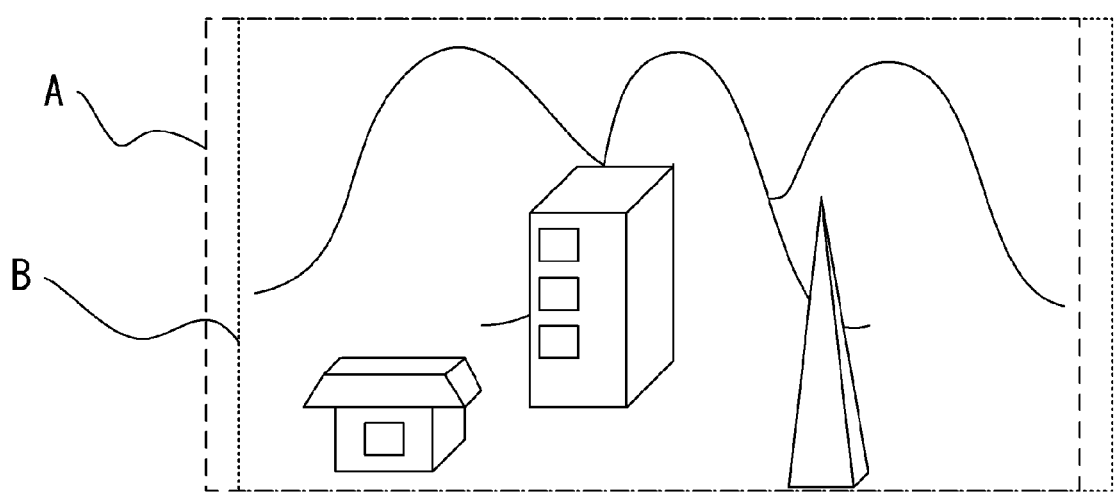
FIG. 4 illustrates an example of the imaging regions of the image sensors according to the first embodiment.

The image sensors 111 and 112 are disposed next to each other, so that an area imaged by the image sensor 111 for the first wave range and an area imaged by the image sensor 112 for the second wave range are not strictly the same area but substantially the same area. FIG. 4 is a schematic diagram illustrating an imaging area A of the image sensor 111 for the first wave range and an imaging area B of the image sensor 112 for the second wave range. The image sensor 111 for the first wave range and the image sensor 112 for the second wave range are displaced from each other on the same plane in order to avoid structural interference. Thus, the imaging area A and the imaging area B of the image sensors 111 and 112 can be substantially aligned, though the ends of the areas have different imaging areas. This can minimize a displacement between the imaging areas A and B.

The positional relationship between the imaging areas A and B is fixed because of the fixed positional relationship between the light receiving surface 113 of the image sensor 111 for the first wave range and the light receiving surface 114 of the image sensor 112 for the second wave range. In the present embodiment, a displacement between the imaging areas A and B is determined, and then the synthetic-image generation unit 120 generates a synthetic image based on information on the displacement. Thus, images captured from the different image sensors 111 and 112 can be synthesized into an image without being displaced from each other, thereby providing a high-quality image.

The second characteristic (2) in the imaging apparatus 100 will be described below. In the present embodiment, the imaging apparatus 100 includes the estimation unit 130 that estimates, in a captured image, the degree of influence of an external factor of the imaging apparatus 100 on each area to be imaged. The estimation unit 130 estimates a misted part in an image by using the position of the imaging apparatus 100 and information on the environment of a subject to be imaged. Thus, the imaging apparatus 100 can reduce an image processing amount as compared with a method of identifying a misted part only from a captured image, achieving a high-speed image output with little delay.

In the present embodiment, the estimation unit 130 includes an imaging-information acquisition unit 140 and an environment-information acquisition unit 150 as means for acquiring the position of the imaging apparatus 100 and information on the environment of an imaging area.

Figure 5:
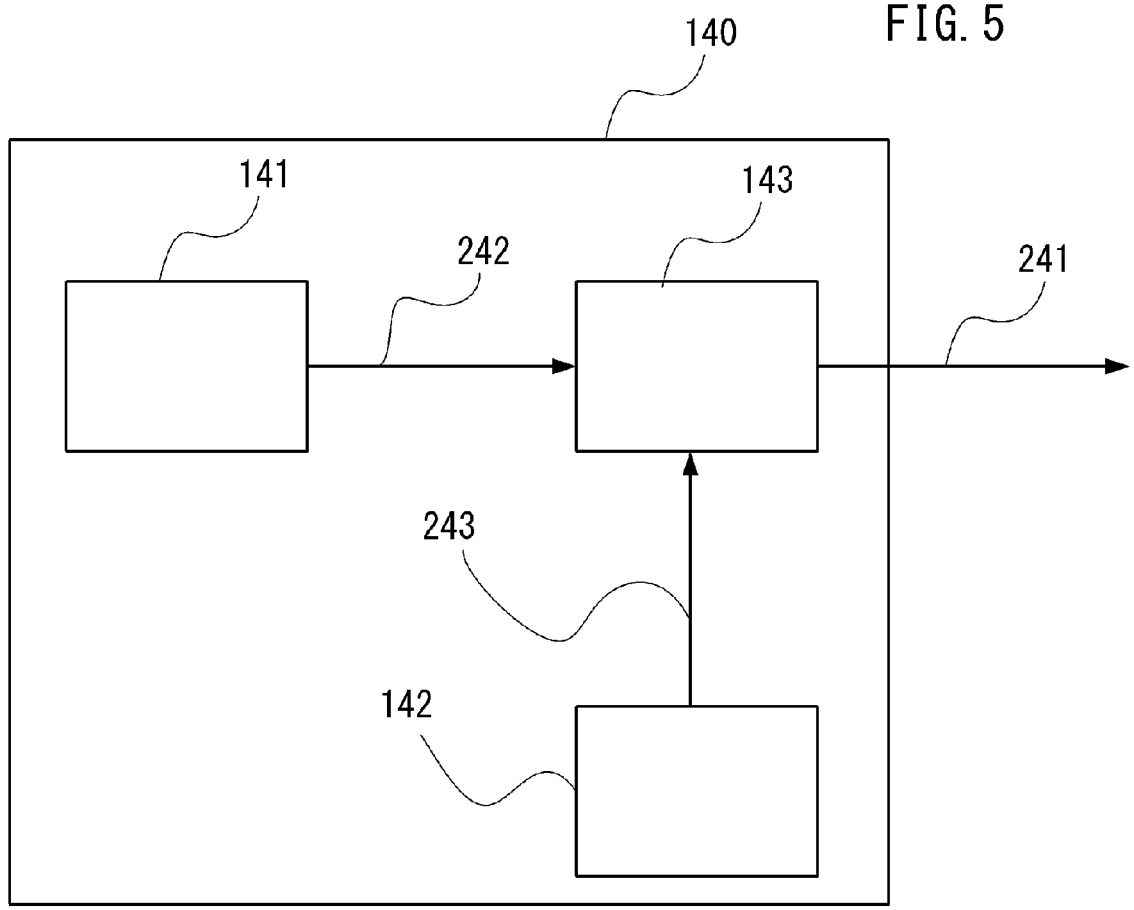
FIG. 5 schematically illustrates the configuration of a position-information acquisition unit according to the first embodiment.

The imaging-information acquisition unit 140 acquires information on the imaging of the imaging apparatus 100 and outputs the information. More specifically, as illustrated in FIG. 5, the imaging-information acquisition unit 140 includes an apparatus-information acquisition unit 141, a map-information acquisition unit 142, and an imaging-information generation unit 143. The apparatus-information acquisition unit 141 acquires apparatus information 242 including position information (e.g., a latitude, a longitude, and a height) on the imaging apparatus 100 and imaging direction information on the imaging apparatus 100. The imaging direction information includes the horizontal orientation (azimuth angle) of the imaging apparatus 100 and an inclination (elevation angle) with respect to a horizontal plane. The apparatus information 242 is output information on sensors including a GPS (Global Positioning System) sensor, a tilt sensor, a magnetic field sensor, and an altitude sensor that are provided in the imaging apparatus 100. The position information on the imaging apparatus 100 may be acquired by an apparatus, for example, a smartphone outside the imaging apparatus 100 and transferred to the imaging apparatus 100.

The map-information acquisition unit 142 acquires three-dimensional map information related to the position of the imaging apparatus 100. The three-dimensional map information is known map information that may be stored in advance in the imaging apparatus 100 or acquired from the outside of the imaging apparatus 100.

The imaging-information generation unit 143 generates imaging information 241 on the imaging apparatus 100 by using the apparatus information 242 acquired from the apparatus-information acquisition unit 141 and three-dimensional map information 243 acquired by the map-information acquisition unit 142. Specifically, the imaging-information generation unit 143 generates information on a distance from the imaging apparatus 100 to a subject to be imaged and the size (e.g., a height or dimensions) of a subject to be imaged, based on the apparatus information 242 and the map information 243. The imaging-information generation unit 143 outputs the generated information as the imaging information 241 with the apparatus information 242 and the map information 243 to the estimation unit 130.

Figure 6:
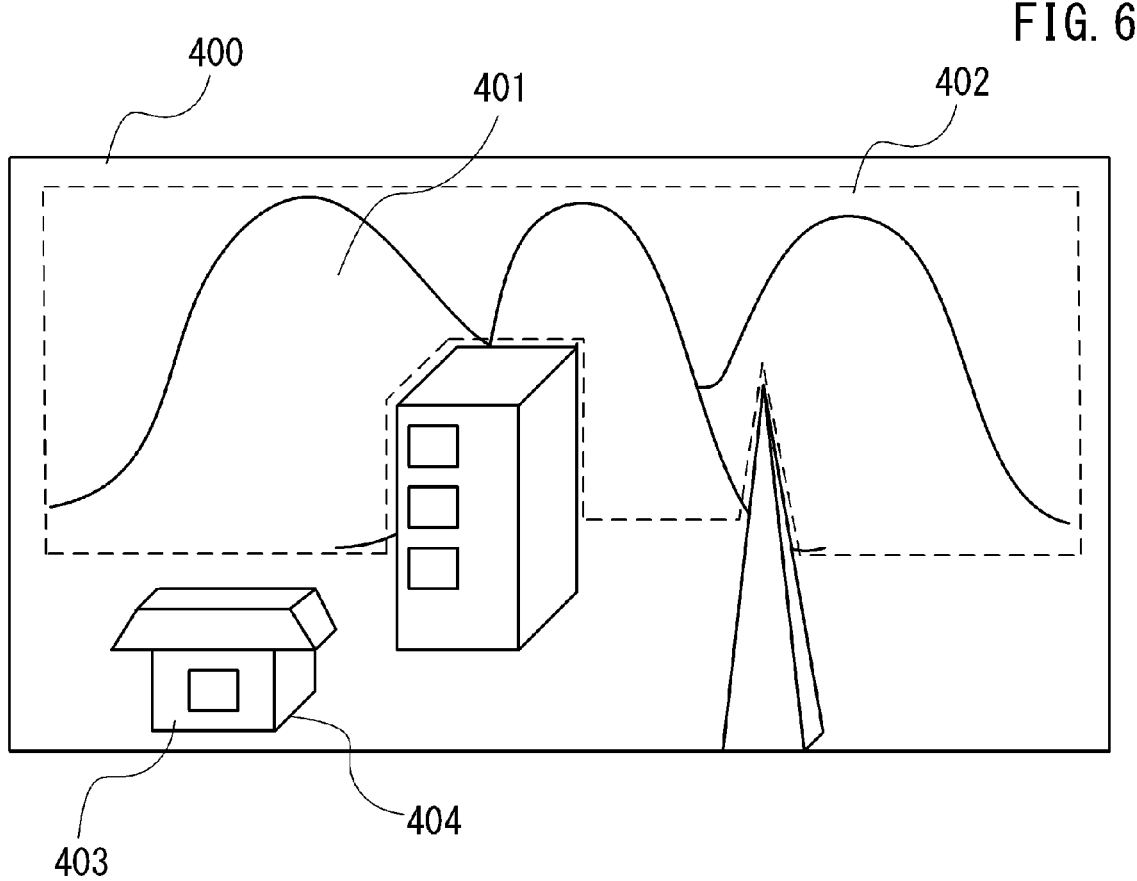
FIG. 6 illustrates an example of a captured image according to the first embodiment.

In an example of a captured image 400 of the imaging apparatus 100 in FIG. 6, a mountain 401 to be imaged in the background of the image 400 is more remote from the imaging apparatus 100 than other subjects to be imaged. It is assumed that an area to be imaged as a mountain is an area 402 (dotted line in FIG. 6) that contains the ridge line of the mountain 401 without containing other subjects to be imaged. The imaging area of the mountain 401 may have any shapes other than that of the area 402 as long as the area is determined based on the ridge line of the mountain 401. A house 403 to be imaged in the foreground of the image 400 is closer to the imaging apparatus 100 than other subjects to be imaged. It is assumed that an area to be imaged as a house is an area 404 surrounded by the silhouette (outline) of the house 403. The imaging area of the house 403 may have any shapes other than that of the area 404 as long as the area is determined based on the outline of the house 403.

The map-information acquisition unit 142 may be configured using a database of typical map information. If the position of the imaging apparatus 100 is not changed, for example, the imaging apparatus 100 is installed at a fixed position, dedicated map data may be stored in advance. Moreover, if the imaging apparatus 100 is installed in a vehicle as an onboard apparatus, the map-information acquisition unit 142 may be configured to use map data for a car navigation system.

In this configuration, the influence of mist in a captured image increases with a distance from the imaging apparatus 100 to a subject to be imaged. Thus, information on a distance from the imaging apparatus 100 to the subject to be imaged is necessary information for correcting a misted part in the image. Moreover, by determining the size of a part to be corrected in an image, the range of a corrected part in the image can be specified based on distance information on a subject to be imaged according to the corrected part. As described above, for the area of each subject to be imaged in a captured image, the imaging-information acquisition unit 140 generates the imaging information 241 that includes a distance from the imaging apparatus 100 to the subject to be imaged and information on, for example, the height and size of the subject to be imaged. Thus, the imaging apparatus 100 can accurately correct a misted part for the area of each subject to be imaged in the captured image.

Figure 7:
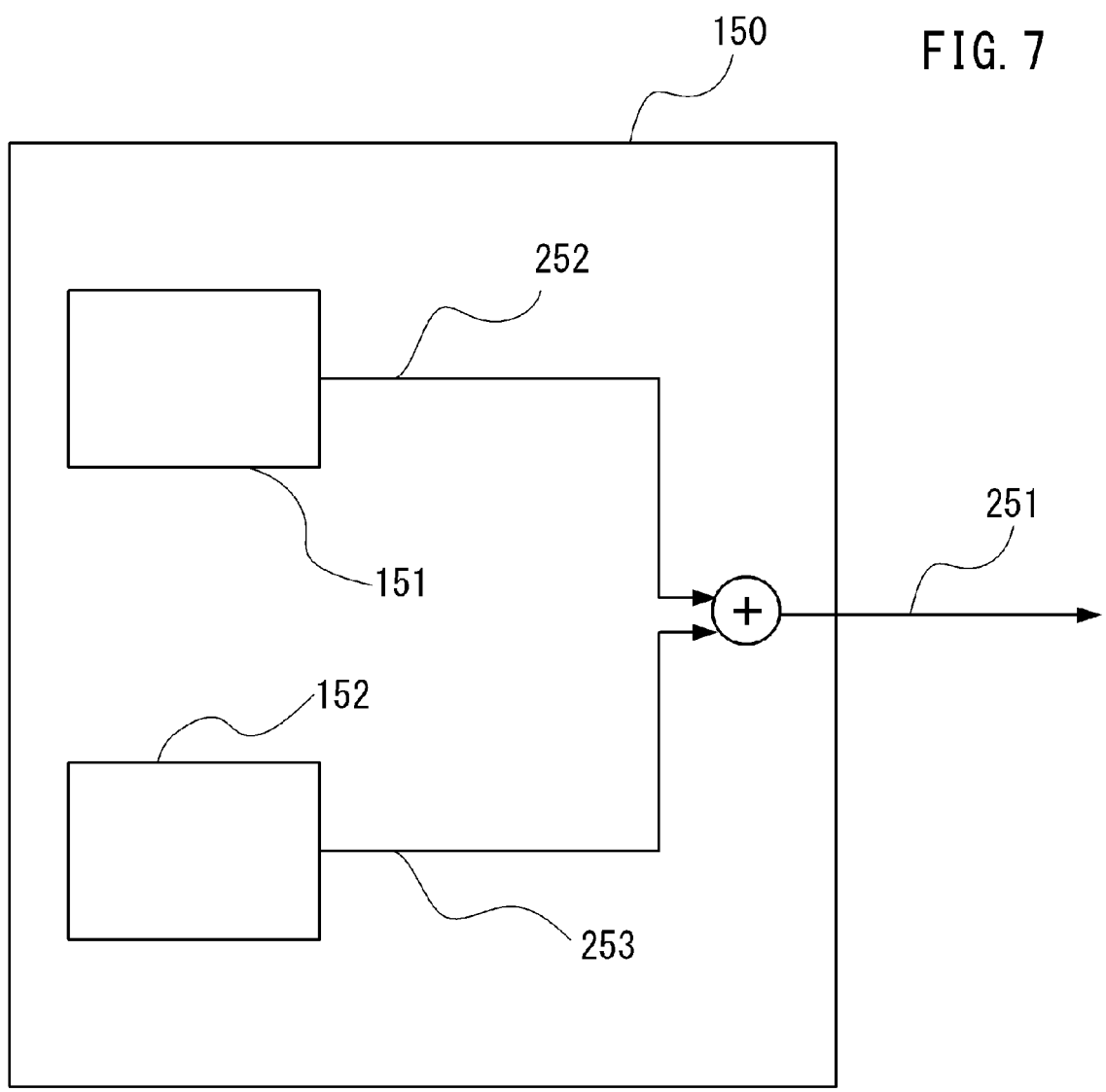
FIG. 7 schematically illustrates the configuration of an environment-information acquisition unit according to the first embodiment.

The environment-information acquisition unit 150 acquires and outputs environment information at the position of the imaging apparatus 100. FIG. 7 illustrates an example of the configuration of the environment-information acquisition unit 150. The environment-information acquisition unit 150 includes a sensor 151 and a communication unit 152. The environment-information acquisition unit 150 outputs imaging environment information 251 to the estimation unit 130. The imaging environment information 251 is generated based on information including a weather, a temperature, a humidity, a weather map, a wind velocity, a wind direction, an amount of spreading pollen/PM2.5, and a position of a water surface at the position of the imaging apparatus 100. The environment-information acquisition unit 150 may acquire forecast information on mist at the position of the imaging apparatus 100 and output the information as the imaging environment information 251 to the estimation unit 130.

The environment-information acquisition unit 150 acquires two kinds of information: environment information (first environment information 252) acquired by the sensor 151 at the position of the imaging apparatus 100 and environment information (second environment information 253) acquired by the communication unit 152 at the position of the imaging apparatus 100.

The first environment information is, for example, environment information including a weather, a temperature, and a humidity that can be obtained near the imaging apparatus 100 by the sensor 151. The sensor 151 may be configured as an external device of the imaging apparatus 100. The environment-information acquisition unit 150 may acquire the first environment information from the external sensor 151. The external sensor 151 is, for example, a smartphone. The second environment information is, for example, a weather map, the position of a water surface, and forecast information on mist, which can be remotely obtained by the communication unit 152 from an external server or the like.

Figure 8:
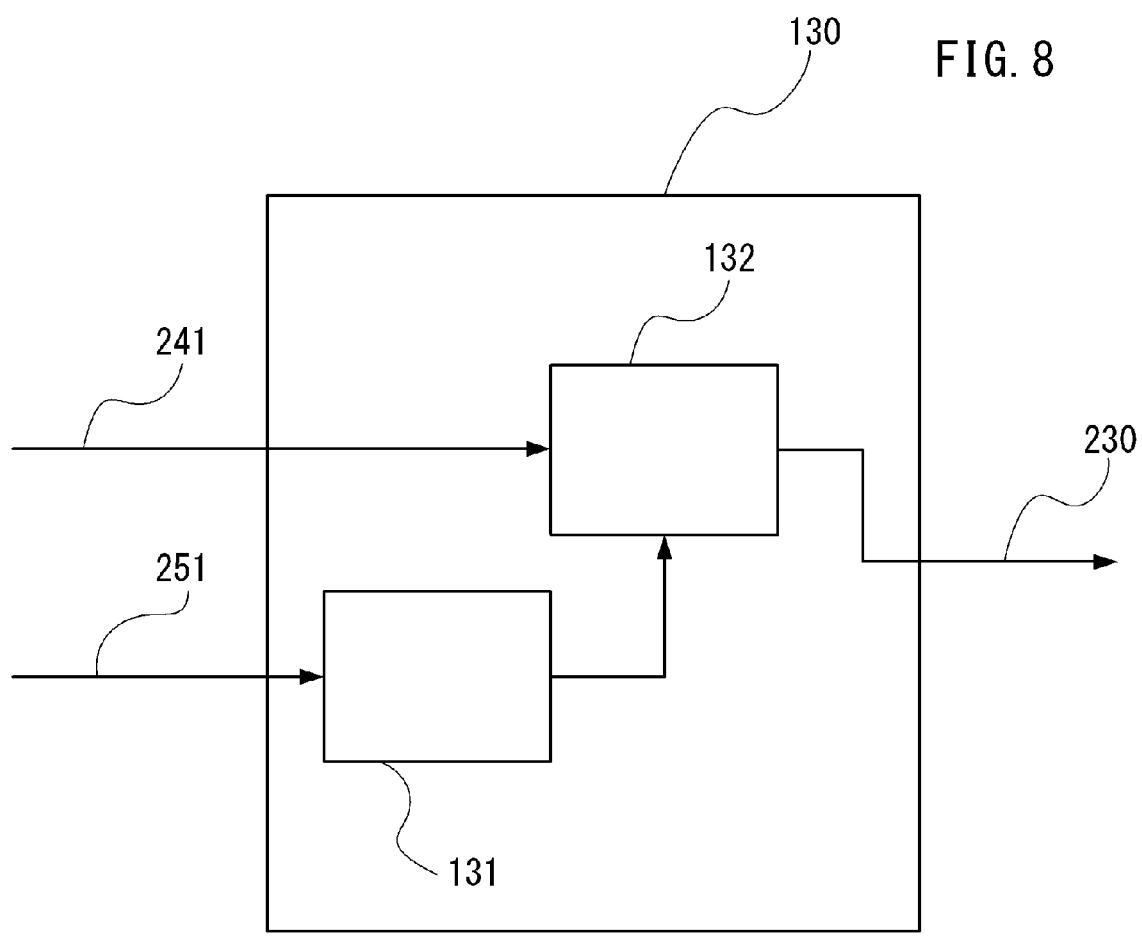
FIG. 8 schematically illustrates the configuration of an estimation unit according to the first embodiment.

The estimation unit 130 estimates a probability of mist at each location to be imaged, by using the imaging information 241, information on a distance from the imaging apparatus 100 to a subject to be imaged and the size of the subject to be imaged, and the imaging environment information 251. Specifically, as illustrated in FIG. 8, the estimation unit 130 includes a probability calculation unit 131 and a coefficient calculation unit 132. The probability calculation unit 131 acquires the imaging environment information 251 and calculates a probability of mist in a captured image. Moreover, the coefficient calculation unit 132 calculates an image synthesis coefficient, which reflects the degree of influence of a misted part on each area to be imaged in a captured image, by using a distance from the imaging apparatus 100 to each subject to be imaged and the probability of mist that is calculated by the probability calculation unit 131. The image synthesis coefficient is a coefficient indicating the ratio of synthesis of the output image 211 from the image sensor 111 for the first wave range and the output image 212 from the image sensor 112 for the second wave range, for each area to be imaged in the captured image. The image synthesis coefficient is calculated such that the ratio of synthesis of the output image 212 increases with the influence of a misted part.

The calculation allows the imaging apparatus 100 to estimate the occurrence of mist in a captured image based on the position of the imaging apparatus 100 and the information on the imaging environment. Thus, the imaging apparatus 100 can estimate the generation of a misted part in real time in the area of each subject to be imaged in a captured image, as compared with a method of identifying the generation of a misted part by performing various kinds of image processing on a captured image. Furthermore, the imaging apparatus 100 can reduce an image processing amount as compared with a method of identifying a misted part only from a captured image, achieving a high-speed image output with little delay.

The third characteristic (3) in the imaging apparatus 100 will be described below. The third characteristic (3) is the use of an image synthesis coefficient 230 that links the first characteristic (1) and the second characteristic (2).

The estimation unit 130 outputs the image synthesis coefficient 230, which is calculated as described above, to the synthetic-image generation unit 120. The synthetic-image generation unit 120 outputs the synthetic image 220 of the output image 211 from the image sensor 111 and the output image 212 from the image sensor 112 based on the ratio of synthesis that is indicated by the image synthesis coefficient 230.

Figure 9:
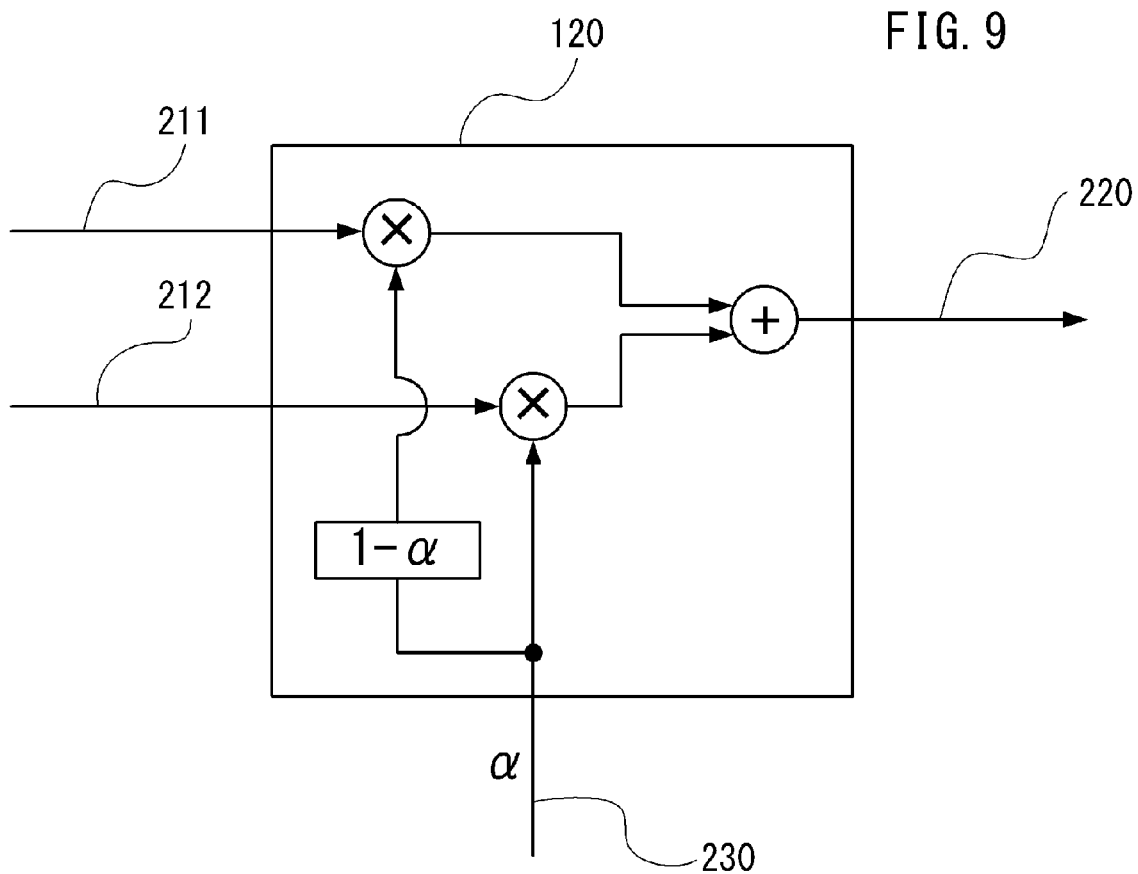
FIG. 9 schematically illustrates the configuration of a synthetic-image generation unit according to the first embodiment.

Referring to FIG. 9, the image synthesis by the synthetic-image generation unit 120 will be specifically described below. As illustrated in FIG. 9, α is the image synthesis coefficient 230 in an area of a captured image. The value of α approaches 1 as the degree of influence of a misted part in the area increases, whereas the value of α approaches 0 as the degree of influence decreases. When α is 0, the influence of a misted part is eliminated, so that for the area, the synthetic-image generation unit 120 only uses the output image 211 from the image sensor 111. When α is 1, the synthetic-image generation unit 120 determines that the influence of a misted part in a captured image with visible light is maximized. Thus, for the area, the output image 211 from the image sensor 111 is not used and only the output image 212 from the image sensor 112 is used. When α is a value between 0 and 1, the synthetic-image generation unit 120 uses a synthetic image of the output image 211 from the image sensor 111 and the output image 212 from the image sensor 112 in the area such that the ratio of the output image 211 and the output image 212 is (1-α):α.

Hence, for each area to be imaged in a captured image, a captured image from the image sensor 111 for visible light and a captured image from the image sensor 112 for infrared light are synthesized. The image from the image sensor 111 is close to recognition by human eyes while the image from the image sensor 112 has a resolution less susceptible to a misted part. Thus, even if mist appears in the imaging environment, the imaging apparatus 100 can generate an image of high image quality with a reduced misted part.

Second Embodiment

A second embodiment will be described below. In the following description, the same constituent elements as those of the first embodiment are indicated by the same reference numerals, and a detailed explanation thereof is omitted.

Figure 10:
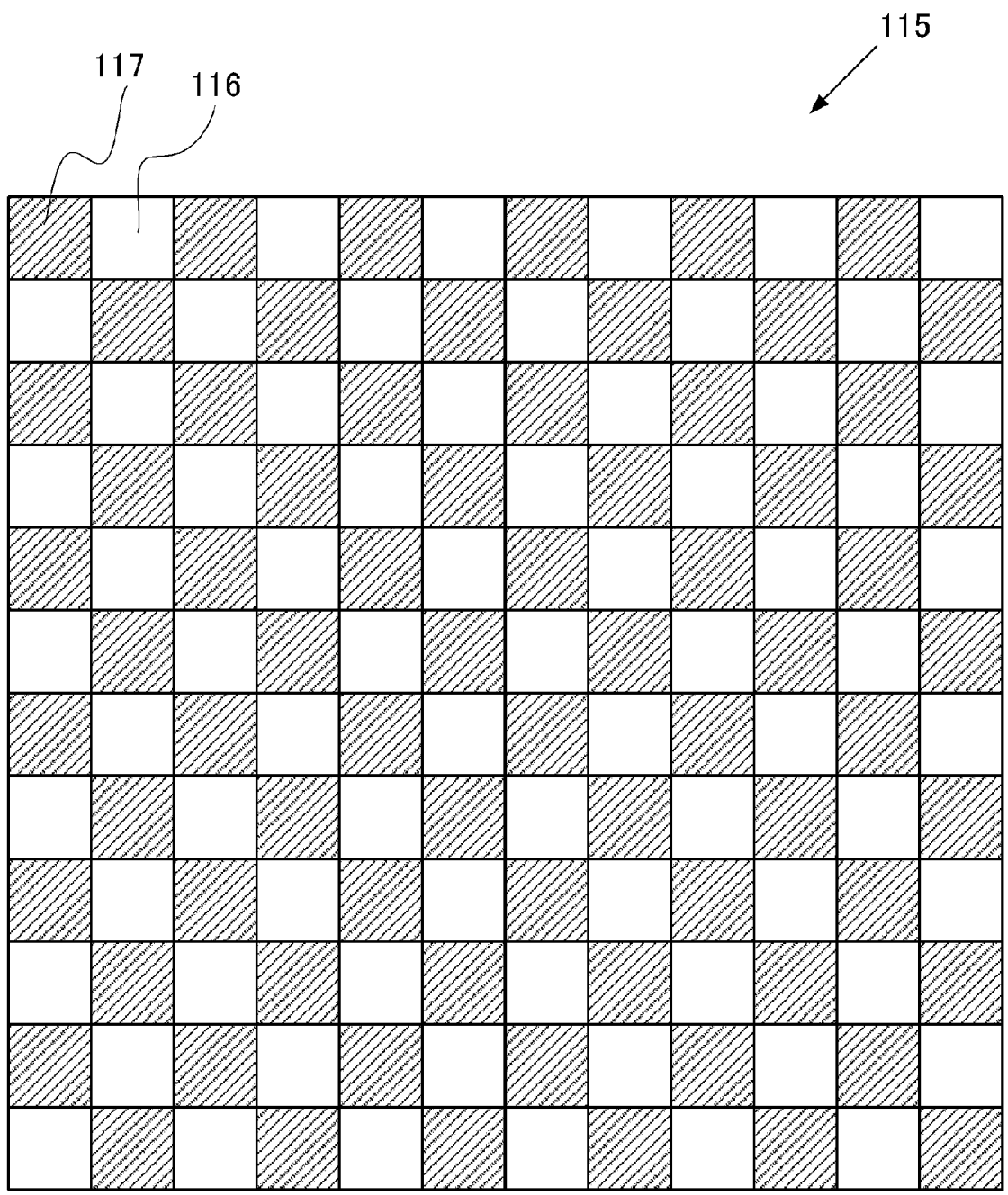
FIG. 10 schematically illustrates the configuration of an image sensor according to a second embodiment.

In an imaging apparatus 100 of the present embodiment, the image sensor 110 of the first embodiment is replaced with an image sensor 115 schematically illustrated in FIG. 10. As illustrated in FIG. 10, the image sensor 115 includes pixels 116 having light receiving sensitivity to a first wave range similar to that of the first embodiment and pixels 117 having light receiving sensitivity to a second wave range similar to that of the first embodiment. As illustrated in FIG. 10, the pixels 116 and the pixels 117 are alternately disposed (in a so-called checkered pattern) in a light receiving surface of the image sensor 115.

In the first embodiment, the two image sensors 111 and 112 are used to perform imaging, whereas in the present embodiment, the single image sensor 115 is used to perform imaging. Hence, a single lens is used to converge light onto the image sensor 115, which does not cause a displacement of imaging regions, whereas a displacement of the imaging regions occurs between the image sensors illustrated with reference to FIG. 4 in the first embodiment. Regarding this point, the imaging apparatus 100 of the present embodiment can reduce the number of constituent elements for imaging by the image sensor as compared with the first embodiment, thereby downsizing the imaging apparatus with lower power consumption.

Figure 11:
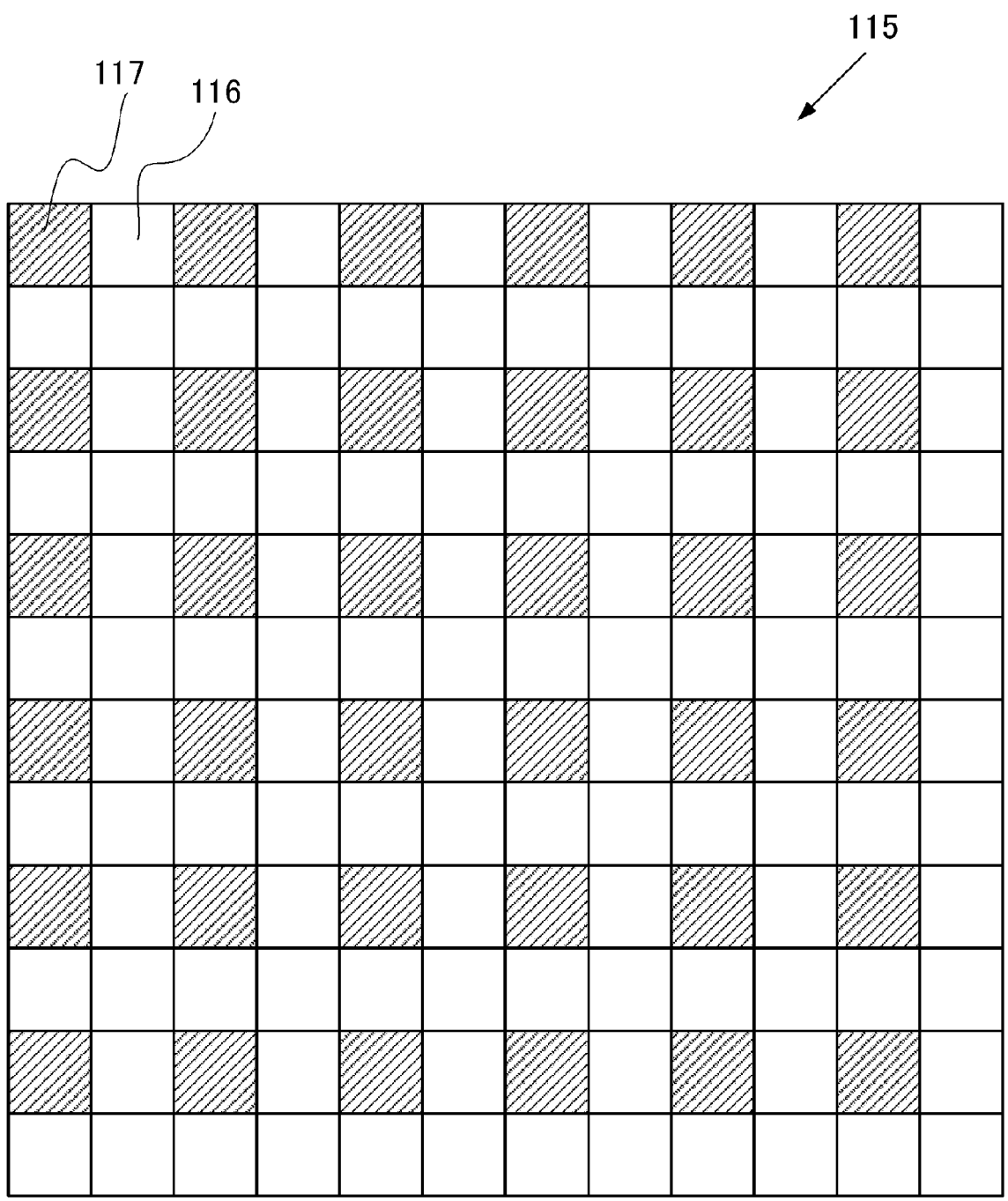
FIG. 11 schematically illustrates another configuration of the image sensor according to the second embodiment.

In the present embodiment, the pixels 116 and 117 are assumed to be disposed in a checkered pattern. The layout of the pixels is not limited to that of FIG. 10. As illustrated in FIG. 11, the present embodiment is also applicable to a layout where the ratio of the number of pixels 116 to the number of pixels 117 is different from that of FIG. 10. The present embodiment is also applicable to a configuration in which the pixels 116 and 117 have different sizes.

Third Embodiment

A third embodiment will be described below. In the following description, the same constituent elements as those of the first and second embodiments are indicated by the same reference numerals, and a detailed explanation thereof is omitted.

Figure 12:
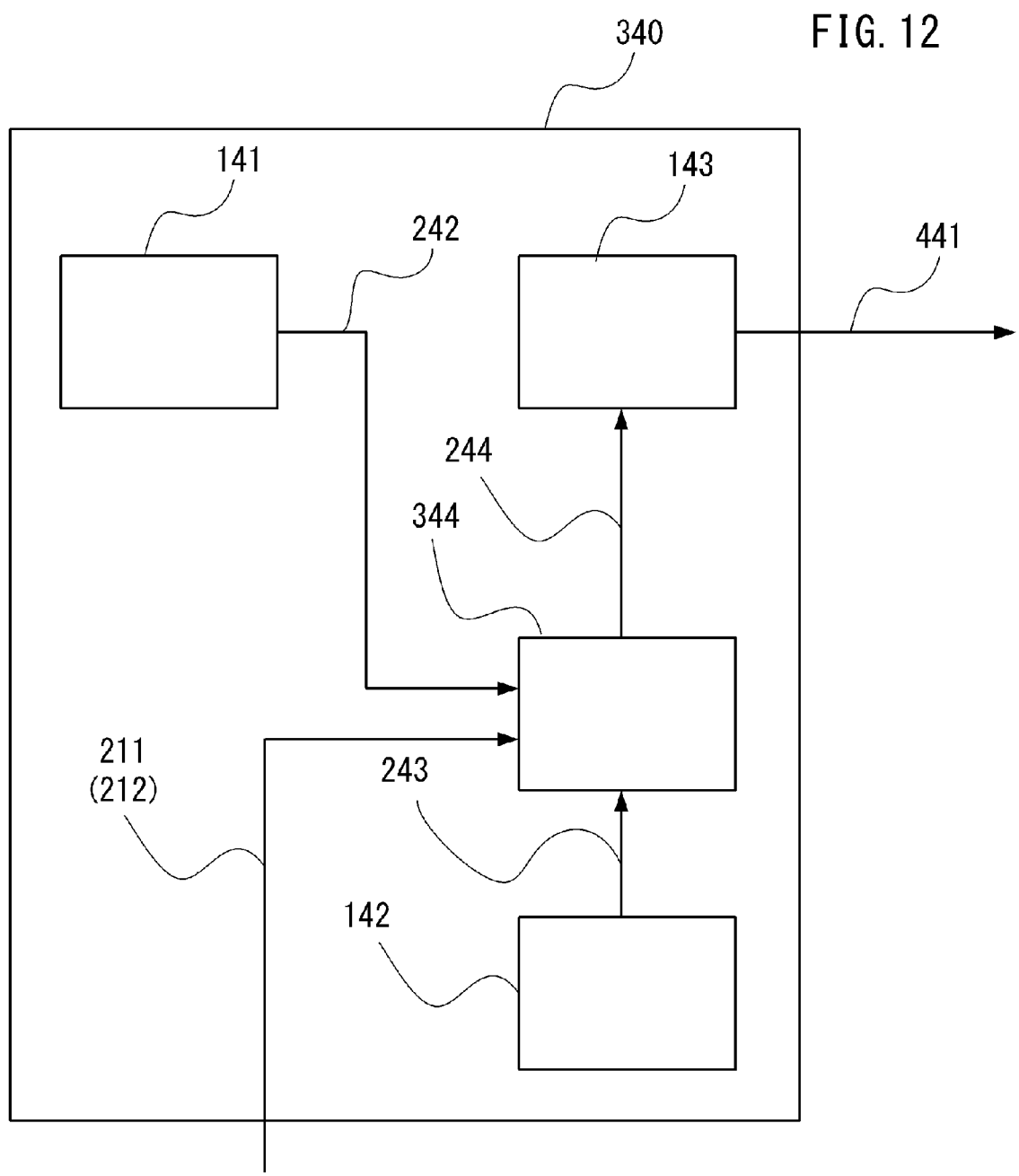
FIG. 12 schematically illustrates the configuration of a position-information acquisition unit according to a third embodiment.

In an imaging apparatus 100 of the present embodiment, the imaging-information acquisition unit 140 of the first and second embodiments is replaced with an imaging-information acquisition unit 340 illustrated in FIG. 12. As illustrated in FIG. 12, the imaging-information acquisition unit 340 includes an apparatus-information acquisition unit 141, a map-information acquisition unit 142, and an imaging-information generation unit 143 that are identical to those of the first embodiment. The imaging-information acquisition unit 340 further includes a matching unit 344 for performing pattern matching with a captured image 211 or 212, which is obtained by an image sensor 110, by using apparatus information 242 and three-dimensional map information 243. In the present embodiment, the pattern matching performed using the actually captured image 211 or 212 by the matching unit 344 can detect a displacement based on, for example, the presence or absence of a building. The matching unit 344 outputs the apparatus information 242, the three-dimensional map information 243, and information 244 including the result of pattern matching to the imaging-information generation unit 143. The imaging-information generation unit 143 generates imaging information 441 by using the result of pattern matching by the matching unit 344 in addition to the apparatus information 242 and the three-dimensional map information 243.

Thus, the present embodiment can more accurately correct a displacement and locate a subject to be imaged in each area of a captured image as compared with the first and second embodiments in which the imaging information 241 is generated by using the apparatus information 242 and the map information 243 instead of the captured image 211 or 212. Moreover, the matching unit 344 performs matching using the captured image 211 or 212 through simple processing according to a known technique of pattern matching, so that the processing of the matching unit 344 is unlikely to interfere with the image processing of the imaging apparatus 100.

As described above, the present embodiment can more accurately specify position information on a subject to be imaged in a captured image, thereby accurately correcting a misted part for the area of each subject to be imaged in the captured image.

In the foregoing description, it is assumed that a subject to be imaged in each area of a captured image can be more accurately located by using the captured image 211 or 212 for pattern matching performed by the matching unit 344. A configuration for generating imaging information by using a captured image according to the present embodiment is not limited to the foregoing configuration. For example, the imaging-information acquisition unit 340 may determine whether an image includes a subject to be imaged (the water surface of a wetland or sea) with a possibility of mist, by using the captured image 221 or 212. The imaging-information acquisition unit 340 may also acquire environment information on a location for using the imaging apparatus 100, by detecting the degree of insolation based on the brightness of the sky at the position of the imaging apparatus 100 or detecting a wind velocity or a wind direction based on the flow velocity of cloud in the sky. The imaging-information acquisition unit 340 is configured to perform such processing to use the processing result for imaging information, allowing the imaging-information generation unit 143 to generate more detailed imaging information. Moreover, the estimation unit 130 can more accurately estimate the influence of generated mist in the captured image 211. As a result, the imaging apparatus 100 can generate an image with a more accurate correction of a misted part in the image.

Fourth Embodiment

A fourth embodiment will be described below. In the following description, the same constituent elements as those of the first to third embodiments are indicated by the same reference numerals, and a detailed explanation thereof is omitted.

Figure 13:
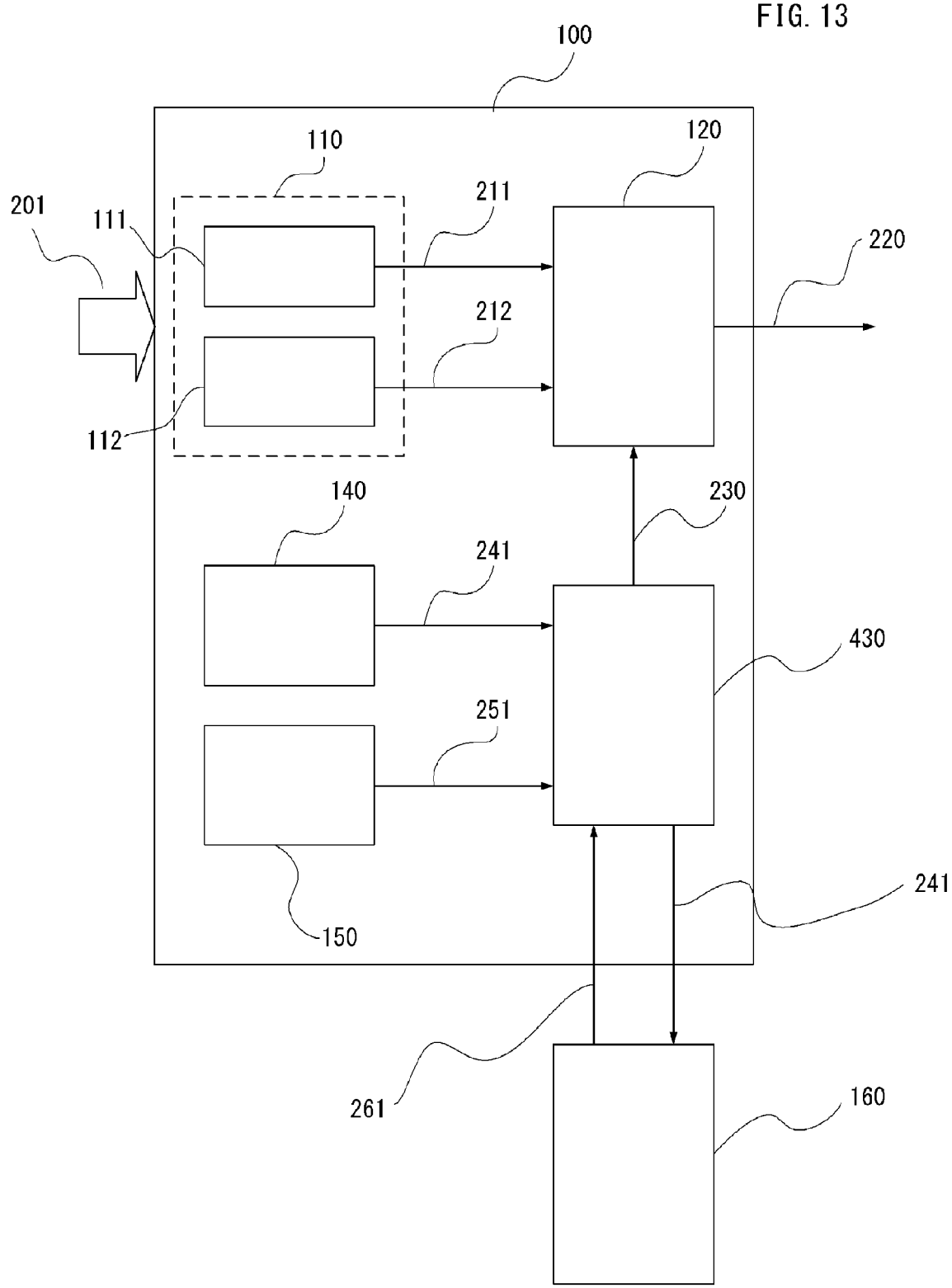
FIG. 13 schematically illustrates the configuration of an estimation unit according to a fourth embodiment.

In the present embodiment, the processing of an estimation unit 430 is different from the processing of the estimation unit 130 according to the first to third embodiments. Referring to FIG. 13, the processing of the estimation unit 430 will be described below. As illustrated in FIG. 13, the estimation unit 430 is connected to a database 160 for storing a learning model in which environment information serves as input data and the presence or absence of mist is learned as correct data. The estimation unit 430 transmits imaging information 241 acquired from an imaging-information acquisition unit 140 to the database 160. The database 160 has a learning model for performing inference of the presence or absence of mist from the environment information. An estimation result 261 indicating the presence or absence of mist is transmitted to the estimation unit 430. The inference result 261 is obtained by inputting the imaging information 241, which is received from the estimation unit 430, to the learning model. The estimation unit 430 predicts the generation of mist in each imaging area and estimates the degree of influence of a misted part in a captured image based on the inference result 261 received from the database 160.

In the present embodiment, estimation result information is used in addition to information on a position and an imaging environment, the estimation result information including a learning model in which the states of mist generated in the past are reflected. This can more accurately identify the possibility of mist in the imaging environment. Thus, the generation of mist can be estimated in consideration of surrounding environments such as terrains of the imaging environment. As a result, in an imaging apparatus 100, a misted part can be accurately corrected for the area of each subject to be imaged in a captured image.

Figure 14:
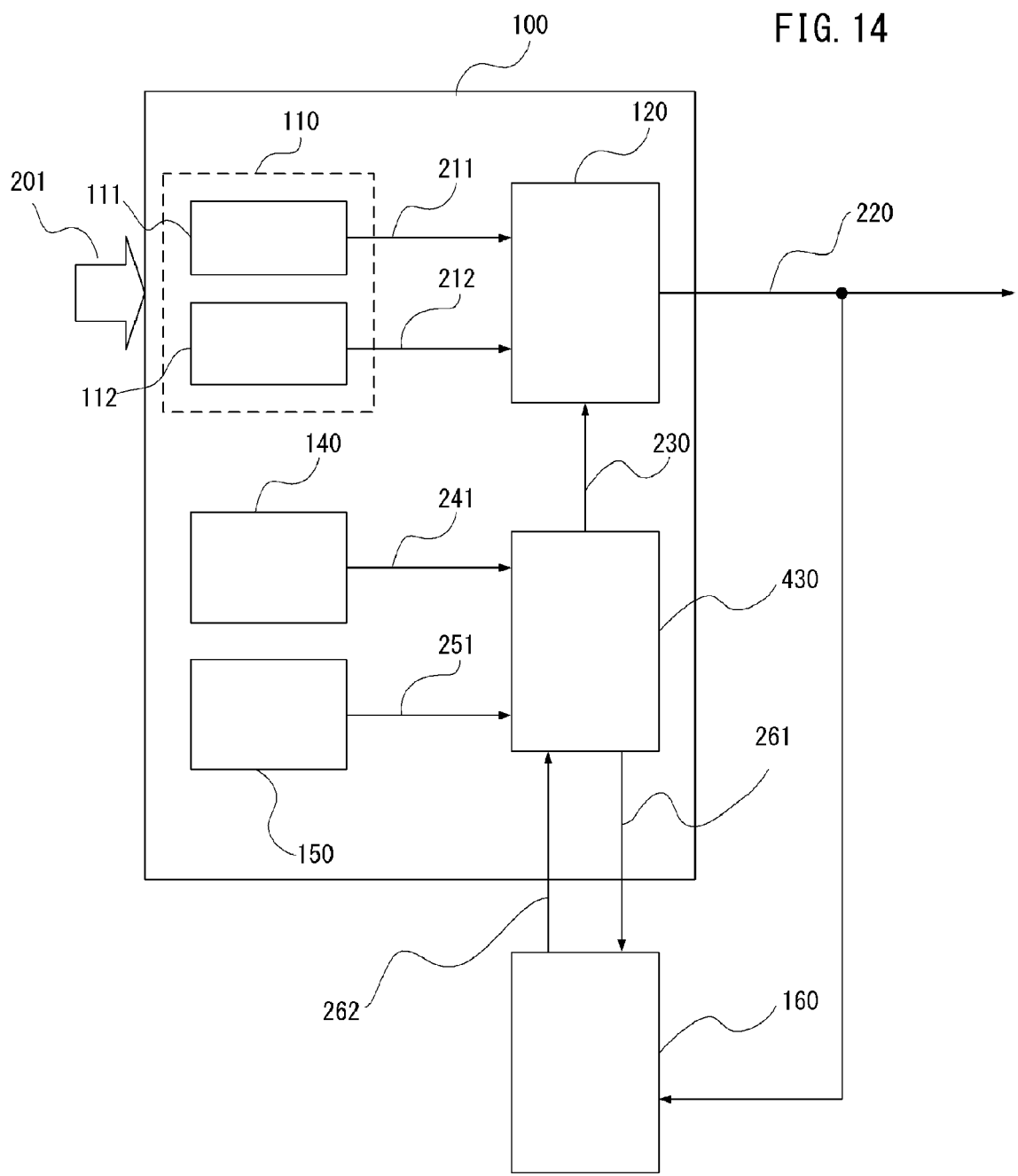
FIG. 14 schematically illustrates another configuration of the estimation unit according to the fourth embodiment.

The present embodiment is also applicable to a configuration illustrated in FIG. 14. In FIG. 14, a synthetic image 220 obtained by the imaging apparatus 100 is also transmitted to the database 160. In FIG. 14, the database 160 has the function of evaluating the correction state of a misted part of the synthetic image 220 of captured images 211 and 212 based on an image synthesis coefficient 230. The database 160 has the function of updating the learning model by using the evaluation result of the correction state of a misted part of the synthetic image 220. Thus, a parameter for predicting the generation of mist by the learning model is adjusted as the number of captured images increases, thereby improving the accuracy of estimating the generation of mist according to the learning model.

In the foregoing description, it is assumed that the database 160 for storing the learning model is provided outside the imaging apparatus 100. The present embodiment is also applicable to a configuration in which the learning model to be stored in the database 160 is stored in advance in the imaging apparatus 100. The imaging apparatus 100 may have a part of the function of the learning model and acquire, for example, data from the outside via a network or the like, the data being used for adjusting the learning model. The learning model is not limited to a learning model for estimating the generation of mist with the environment information serving as an input. Various learning models available for the acquisition of an image with a reduced misted part may be used. Examples of the learning model include a learning model for estimating the degree of influence of a distance from the imaging apparatus to a subject to be imaged on an image, a learning model for estimating the ratio of synthesis of the images 221 and 212, and a learning model for estimating the size and the pattern of an area to be imaged. As described above, various parameters used for the learning model may be adjusted by using a synthetic image 220 of the imaging apparatus 100.

Fifth Embodiment

A fifth embodiment will be described below. In the following description, the same constituent elements as those of the first to fourth embodiments are indicated by the same reference numerals, and a detailed explanation thereof is omitted.

Figure 15:
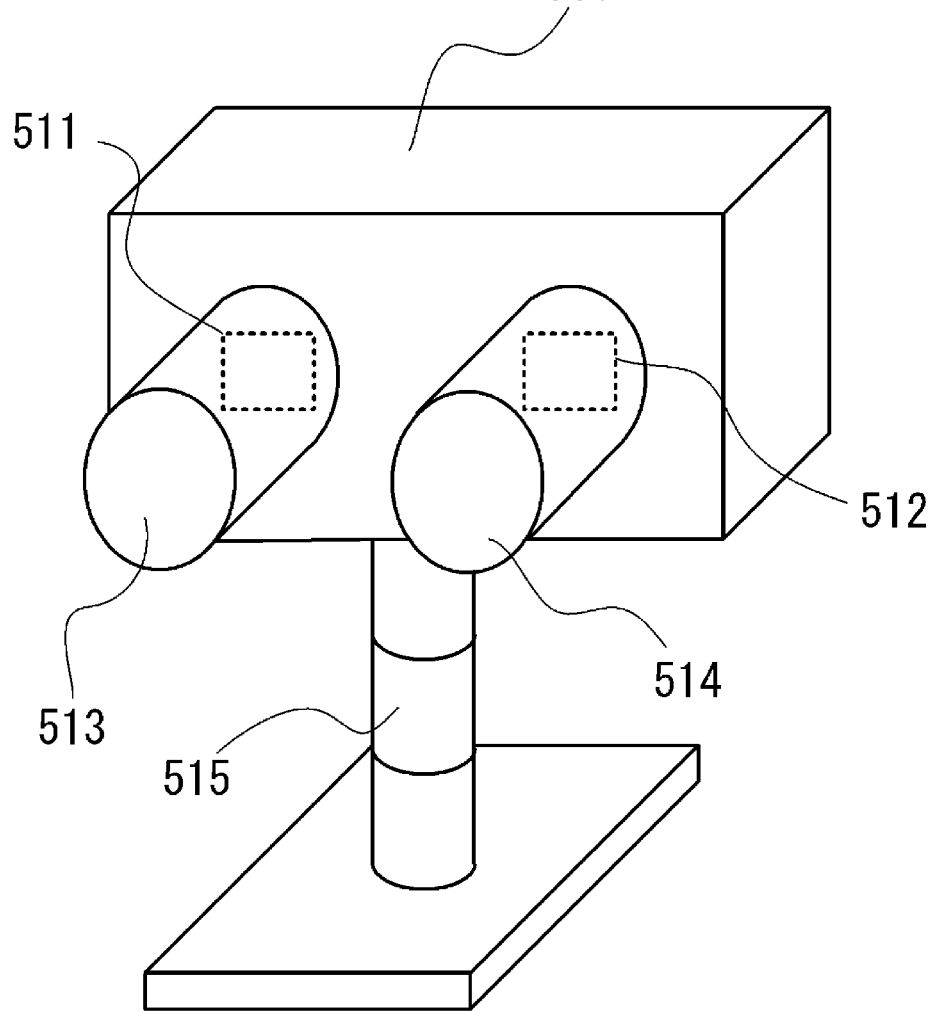
FIG. 15 schematically illustrates an example of an imaging system according to a fifth embodiment.

The present embodiment will describe a monitoring system as an example of an imaging system in which the imaging apparatus 100 described in the foregoing embodiments is used. FIG. 15 is a schematic diagram illustrating an example of a monitoring system 500 according to the present embodiment. As illustrated in FIG. 15, the monitoring system 500 includes a camera 510 that can acquire images in the wave ranges of visible light and infrared light. The camera 510 is provided with a visible-image imaging unit 511 for imaging of an image in the wave range of visible light and an infrared-image imaging unit 512 for imaging of an image in the wave range of infrared light. The visible-image imaging unit 511 has a lens 513 for imaging of a visible image and the infrared-image imaging unit 512 has a lens 514 for imaging of an infrared image. The monitoring system 500 further includes a swivel base 515 that rotatably supports the camera 510.

The visible-image imaging unit 511 has an image sensor 111 for a first wave range while the infrared-image imaging unit 512 has an image sensor 112 for a second wave range. Light converging through lenses 513 and 514 provided in the front of the photographing units 511 and 512 form images on the light receiving surfaces of the image sensors 111 and 112. The camera 510 has the function of the imaging apparatus 100 described in the foregoing embodiments and outputs a synthetic image of images captured at two wavelengths. The camera 510 is placed on the swivel base 515 and can rotate with respect to the center of rotation of the swivel base 515.

The monitoring system 500 is usable as a system for monitoring intruders at sites such as a factory and an airport, a system for monitoring ships in a coastal region, and a system for monitoring aircrafts as well as a surveillance camera on the streets. For the purpose of remote monitoring of, for example, a system for monitoring intruders at sites, a system for monitoring ships in a coastal region, and a system for monitoring aircrafts, in particular, the quality of a captured image is likely to deteriorate due to the influence of mist. Thus, the reliability of a monitoring system is expected to be improved from the conventional art by using the monitoring system 500 according to the present embodiment.

Even if an imaging area is changed by rotating the camera 510 by means of the swivel base 515, a misted part in an image can be corrected in real time in the monitoring system 500 as in the foregoing embodiments. This can obtain a high-quality image also in a monitoring system that particularly requires readiness. If the camera 510 is used at a fixed position, three-dimensional map data on an imaging area is stored in advance in a storage unit of the camera 510, thereby more quickly generating an image. If a plurality of pieces of three-dimensional map data are stored in advance in the storage unit of the camera 510 in consideration of the rotation range of the swivel base 515 and the zoom areas of the lenses 513 and 514, thereby more quickly generating an image when the imaging conditions are changed by the rotation or zooming of the camera 510.

Other Embodiments

The present disclosure can be also implemented in processing in which a program for implementing at least one function of the embodiments is supplied to a system or an apparatus via a network or a storage medium, and the program is read and executed by at least one processor in the computer of the system or the apparatus. Alternatively, the present disclosure can be also implemented by a circuit (e.g., an ASIC) for implementing at least one function.

The technique of the present disclosure can obtain a high-quality image that is less affected by a misted part in an image by an external factor of the imaging apparatus, for example, mist.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-166212, filed on Sep. 30, 2020, which is hereby incorporated by reference herein in its entirety.

What is claimed is:
1. An imaging apparatus comprising:
a first image sensor configured to receive light of a first wave range;
a second image sensor configured to receive light of a second wave range other than the first wave range;
an information acquisition unit configured to (A) acquire (1) position information relating to the imaging apparatus, (2) environment information relating to an imaging environment of the imaging apparatus, and (3) map information relating to a position of the imaging apparatus, and (B) generate, based on the position information and the map information, information on each subject to be imaged;
an estimation unit configured to (A) determine, for each subject to be imaged by the imaging apparatus, an area that generates mist in an image imaged by the imaging apparatus, and (B) estimate, based on the determined area, influence of generation of mist on a first image, which is obtained from the first image sensor, by using (1) the position information, (2) the environment information, and (3) the information on each subject to be imaged; and
an image synthesis unit configured to synthesize the first image and a second image, which is obtained from the second image sensor, on the basis of the influence estimated by the estimation unit,
wherein the information acquisition unit corrects the position information on the basis of pattern matching using (1) the first image and apparatus information of the imaging apparatus including the position informa- tion and imaging direction information or (2) the second image and the apparatus information of the imaging apparatus.

2. The imaging apparatus according to claim 1, wherein the influence is influence of generation of mist in the imaging environment.

3. The imaging apparatus according to claim 2, wherein the information acquisition unit acquires imaging information indicating, by using the first image or the second image, whether the image includes a subject to be imaged that enhances a possibility of generation of mist, and
wherein the estimation unit estimates the influence of the generation of mist on the first image by using the position information, the environment information, and the imaging information.

4. The imaging apparatus according to claim 2, wherein the environment information is information indicating at least one of a degree of insolation, a wind velocity, and a wind direction at a position of the imaging apparatus.

5. The imaging apparatus according to claim 1, wherein a light receiving surface of the first image sensor and a light receiving surface of the second image sensor are on a same plane.

6. The imaging apparatus according to claim 1, wherein the first image sensor and the second image sensor are image sensors identical to each other, each of which includes a pixel having light receiving sensitivity to the light of the first wave range and a pixel having light receiving sensitivity to the light of the second wave range.

7. The imaging apparatus according to claim 1, wherein the first wave range is a wave range of visible light, and
wherein the second wave range is a wave range of infrared light.

8. The imaging apparatus according to claim 1, wherein the environment information includes (1) first environment information obtainable near the imaging apparatus and (2) second environment information remotely obtainable from outside of the imaging apparatus.

9. The imaging apparatus according to claim 1, wherein the estimation unit estimates, for each subject to be imaged in the first image, the influence on the first image on the basis of a distance from the imaging apparatus to the subject to be imaged.

10. The imaging apparatus according to claim 1, wherein the image synthesis unit synthesizes the first image and the second image such that a ratio of the second image increases in accordance with the influence on the first image, estimated by the estimation unit, becoming greater.

11. The imaging apparatus according to claim 1, wherein the information acquisition unit acquires at least the environment information, and
wherein the estimation unit estimates the influence on the first image by using a learning model in which, with the environment information being input data, the influence on the first image is learned as correct data, and by using an inference result obtained by inputting the environment information acquired by the information acquisition unit to the learning model.

12. An imaging system comprising:
the imaging apparatus according to claim 1; and
a processor for processing a signal outputted from the imaging apparatus.

13. The imaging apparatus according to claim 1, wherein the pattern matching is performed by the information acquisition unit using three-dimensional map information in addition to the first image or the second image.

14. An imaging method comprising:
an information acquisition step of (A) acquiring (1) position information relating to an imaging apparatus, the imaging apparatus including (a) a first image sensor for receiving light of a first wave range and (b) a second image sensor for receiving light of a second wave range other than the first wave range, (2) environment information relating to an imaging environment of the imaging apparatus, and (3) map information relating to a position of the imaging apparatus, and (B) generating, based on the position information and the map information, information on each subject to be imaged;

an estimation step of (A) determining, for each subject to be imaged by the imaging apparatus, an area that generates mist in an image imaged by the imaging apparatus, and (B) estimating, based on the determined area, influence of generation of mist on a first image, which is obtained from the first image sensor, by using (1) the position information, (2) the environment information, and (3) the information on each subject to be imaged; and an image synthesizing step of synthesizing the first image and a second image, which is obtained from the second image sensor, on the basis of the influence estimated in the estimation step, wherein the information acquisition step corrects the position information on the basis of pattern matching using (1) the first image and apparatus information of the imaging apparatus including the position information and imaging direction information or (2) the second image and the apparatus information of the imaging apparatus.

* * * * *